Oct. 2, 1956
F. A. DOBSON ET AL
2,765,097
MANHOLE COVER
Filed July 27, 1954
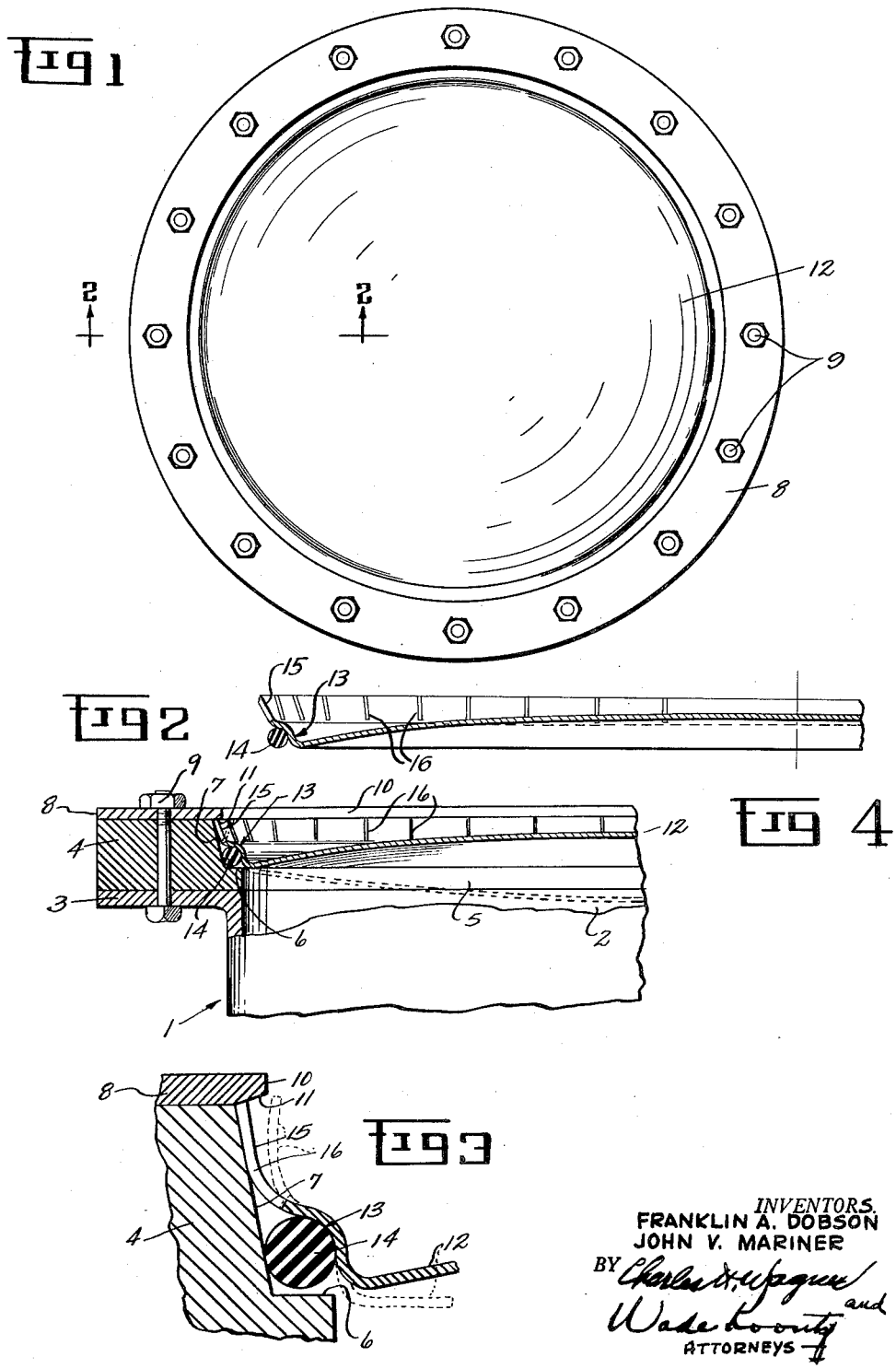
INVENTORS.
FRANKLIN A. DOBSON
JOHN V. MARINER
BY Charles H. Wagner
and Wade Koonty
ATTORNEYS United States Patent Office 2,765,097
Patented Oct. 2, 1956

2,765,097

MANHOLE COVER

Franklin A. Dobson, Whittier, and John V. Mariner, Upland, Calif., assignors to the United States of America as represented by the Secretary of the Air Force Application July 27, 1954, Serial No. 446,186

9 Claims. (Cl. 220—60)

This invention relates to removable closures for pressurized vessels, and more particularly to manhole cover structures for openings in pressurized cabins, chambers, and the like, which are sufficiently large for a man to go through.

An object of the invention is the provision of a simple form of manhole opening structure and a substantially resilient outwardly bowed sheet metal cover or closure therefor, with means providing a positive interlock and pressuretight seal between the cover and the wall of the manhole, especially when the closure is pressurized, whereby upon removal of the pressure the cover may be easily bowed inwardly to disengage the interlock and free the cover for subsequent removal.

A further object of the invention is the provision of a structure having an annular manhole cover receiving opening formed with an overhanging annular flange around the opening and a cooperating cover of relatively resilient thin sheet material, having an annular gasket groove adjacent its periphery, in which the cover is bowed outwardly in the area inclosed by the gasket groove with the periphery of the cover flared outwardly from the gasket groove for locking engagement at its periphery with the annular overhanging flange with the outwardly flared annular portion slit inwardly at a large number of spaced intervals around its periphery to divide the outwardly flared portion into a plurality of locking fingers with flexibility, whereby flexing the outwardly bowed portion inwardly flexes the outer ends of the outwardly flared slit portions inwardly to clear the overhanging flange portion to free the cover for removal from the opening.

A still further object includes the provision of an annular rubber-like gasket member which is circular in cross-section and seated in the gasket groove for sealing engagement with the periphery of the cover receiving opening in rearwardly spaced relation to the overhanging flange, in which the slotted periphery of the outwardly flared portion is disposed for abutting relation behind the overhanging flange whereby the outwardly flared portion forces the gasket into tight sealing contact between the gasket groove and the periphery of the manhole opening.

A further object is the provision of a cover having a shallow bowed out or cambered central portion surrounded by the gasket groove having a somewhat semielliptical curvature rather than circular curvature in cross-section, whereby the bowed out portion at the center has less curvature than that nearer the periphery and is more easily bowed inwardly to withdraw the locking fingers to release the cover.

Other objects and advantages of the invention will become apparent from the following description and accompanying drawings in which like reference characters refer to like parts in the several figures.

DRAWINGS

Figure 1 is a plan view of a structure incorporating a manhole and cover therefor, made in accordance with the invention.

Figure 2 is a fragmentary sectional view taken aproximately on the plane indicated by line 2—2 in Figure 1, showing the cover in full lines in sealed interlocked relation, and in dotted lines in release position and;

Figure 3 is an enlarged fragmentary detail view, more clearly illustrating the construction involving the overhanging flange, annular gasket groove, gasket member, showing the sealing relation under pressure.

Figure 4 is a fragmentary transverse vertical sectional view through the cover, showing the somewhat semielliptical cross section.

Referring to Figure 2 of the drawings the reference numeral 1 denotes the wall of a pressurized chamber having a manhole or opening 2, surrounded by an annular flange 3. An annular ring member 4 is secured on the flange 3 and formed with a circular opening 5, concentrically enlarged to provide an annular stop shoulder 6, the wall of the opening flaring outwardly from the rear edge of the outwardly facing shoulder 6 to form an outwardly inclined annular wall or opening 7, best seen in Figures 2 and 3. The manhole is shown circular in the drawings.

An overhanging circular concentric flange member, in the form of a ring 8, is provided, secured tightly against the outer face of the ring member 4 by clamping bolts 9, securely clamping the cover seating and seating ring member 4 between the flange 3 and the ring 8, the edge of the ring opening 10 overhangs the outer periphery of the flared opening or wall 7 to provide an annular shoulder 11, facing inwardly, preferably beveled to dispose the overhanging surface thereof at an angle substantially perpendicular to the annular outwardly flared surface or wall 7.

The manhole cover 12, best shown in Figures 2, 3 and 4, comprises a relatively thin resilient, circular closure plate preferably formed of sheet material, having an annular sealing gasket receiving groove or channel 13 formed therein adjacent its periphery, for receiving an annular rubber-like sealing ring or "O" ring gasket 14 therein disposed for sealing contact with the annular tapered opening or outwardly flared wall portion 7. The inner or central portion of the cover 12, located within the area surrounded by the gasket receiving groove 13, is bowed or cambered outwardly as shown in Figure 4, being somewhat semielliptical rather than being circular in cross-section, with a low or comparatively flat camber with the curvature increasing from the center toward the periphery so that upon the application of inward pressure at the center of the more easily bowed out portion the same can be bowed inwardly or snapped to a reverse cambered position as shown in dotted lines in Figure 2, somewhat like the conventional "snap action" of an outwardly bowed oil can bottom.

The periphery or rim of the cover 12 is flared outwardly from the gasket groove 13, as indicated at 15, being provided with radial slits 16 located fairly close together to provide locking fingers as shown, extending inwardly from the outer periphery or edge of the cover to substantially the outer edge of the annular gasket groove 13.

As shown in Figures 3 and 4, the inwardly extending slits 16 terminate short of the outer edge of the contact portion of the gasket groove 13, and the gasket member 14 seated in the groove is similar to a rubber "O" ring and is designed to face the outwardly facing circular flange and the outwardly flared wall.

The slits 16 cause the outwardly flared segments or fingers to fulcrum, so to speak, relative to the point of contact of the rubber ring 14 with the outwardly facing flange and therefore as the outbowed closure plate central portion 12 is pressed inwardly past a "dead center" plane toward the dotted line position shown in Figure 2, the rim portion fingers fulcrum, so to speak, substantially on the rubber gasket member 13, rocking the outer extremities 16 inwardly from under the overhanging flange 10 to free the cover 12 for removal. Pressure, of course, must be relieved from behind the cover before it can be depressed inwardly for the release action.

When inserted in closed position, the application of pressure behind the cover tends to bow the cover farther outwardly rocking the extremities of the slit segments or locking fingers outwardly into tighter contact with the wall of the opening 7 behind the overhanging flange 10 and the O ring seal gasket is wedged therebetween forming a pressuretight seal. It is contemplated that the shape or camber of the bowed out portion of dome is somewhat semielliptical in cross section rather than circular in section. This gives a larger angle between the tangent and the horizontal than would be the case if the section were circular in cross-section. This larger angle is advantageous for the following reasons: For a given pressure and overall height of dome, the stresses at the rim are lower, also when the dome is "oil-canned" (depressed inwardly to position shown in dotted lines in Figure 3) a greater rotation of the cover edge or fingers is produced so as to clear the overhanging edge of the retaining ring 8.

The invention is shown and described in one simplified embodiment for exemplary purposes, rather than in a limiting sense. Therefore, it will be apparent that various minor changes and modifications may be made without departing from the spirit and scope of the invention as defined in the following claims.

We claim:

1. In a closure for a pressure chamber having an access opening therethrough, a ring member adapted to be fixed to the chamber surrounding said access opening, said ring member having a central opening therethrough conforming substantially to the size and shape of the access opening, said central opening flaring outwardly to form an annular outwardly inclined surface surrounding said central opening, an annular stop shoulder on the said ring member surrounding said central opening at the inner edge of the outwardly inclined surface facing outwardly substantially toward said annular outwardly inclined surface, an overhanging flange on said ring member surrounding said central opening at the outer end of the outwardly inclined surface overhanging the outer end of said annular inclined surface to form a stop shoulder facing inwardly substantially toward said outwardly facing stop shoulder, a resilient substantially thin cover member receivable in the central opening for closing said access opening, having an annular gasket receiving groove therein adjacent the periphery of the cover member formed to overlie and face the outwardly facing stop shoulder and the outwardly inclined surface when the cover member is inserted in said central opening, said cover member having an annular peripheral portion flaring outwardly from said gasket receiving groove, extending outwardly toward the said inwardly facing stop shoulder with its outer edge underlying the inwardly facing stop shoulder when the cover member is inserted in the central opening, the back of said cover member within the area surrounded by the gasket receiving groove being bowed outwardly toward the plane of said outer edge of the outwardly inclined surface to form a low, resilient, outwardly cambered portion extending over the area of said central opening when said cover member is inserted in said central opening, an annular rubber-like sealing gasket member disposed in said annular gasket groove for sealing contact with the outwardly inclined surface of said outwardly flared opening, and for contact with said outwardly facing stop shoulder, to seal the space between said cover member and said outwardly inclined surface, the outwardly flared portion of said cover being slit inwardly at a plurality of points around the periphery of the cover to form a plurality of outwardly inclining locking fingers disposed for locking engagement with the inwardly facing stop shoulder of said overhanging flange, when the cover is inserted in the central opening with the cambered portion thereof bowed outwardly, said low cambered portion being arranged for flexure inwardly thereof toward the central opening by pressure applied to the back of the cambered portion for engaging said gasket sealing member with said outwardly facing stop shoulder whereby to rock the locking fingers inwardly to withdraw the outer extremities of said fingers from under the inwardly facing annular stop shoulder of said overhanging flange, to free the cover for removal from said central opening.

2. A cover member as set forth in claim 1 in which the outwardly cambered portion is formed with a somewhat semielliptical curvature in cross-section having a comparatively flat camber, whereby the bowed out portion can be depressed inwardly to snap past a plane extending through the annular gasket groove in the manner of a conventional "snap action" oil can bottom, and whereby the semielliptical curved cross-sectional shape of the bowed out portion or dome provides a larger angle between the tangent and the horizontal than would be the case if the cross sectional curvature of the bowed out portion were formed with a circular curvature.

3. A removable closure for a manhole opening in a pressurized chamber, a substantially rigid base plate member adapted to span the opening having a manhole formed therein for registration with said opening said plate having an annular stop flange portion between the front and rear faces thereof facing outwardly relative to the rear face thereof which is adapted to engage and span the manhole opening, said plate having a concentric outwardly inclined annular wall, extending from the inner edge of said annular stop shoulder toward the outer or front face of the plate and surrounding the periphery of the manhole, an annular concentric overhanging flange of the manhole projecting inwardly at the outer end of the inclined annular wall facing inwardly, forming an annular stop flange around the periphery of said manhole, overlaying the inclined wall only and not the outwardly facing annular stop shoulder, said inwardly facing stop flange being disposed substantially perpendicular to the extremity of the outwardly inclined wall adjacent to the juncture therebetween, a resilient flexible sheet metal manhole cover member fitting said manhole in the plate, having a comparatively low outwardly cambered back portion shaped to span said manhole in the plate with the periphery of the cambered portion having a shape and size substantially conforming to the shape and size of the manhole in the plate adjacent the inner edge of the outwardly facing annular stop shoulder, said cover having an annular gasket groove formed therein, facing toward the outwardly facing stop shoulder and the inclined wall adjacent the juncture thereof with the outwardly facing stop shoulder, said cover having an annular outwardly and rearwardly inclined peripheral wall, terminating in a peripheral edge disposed to interlock under the overhanging flange for engagement with the inwardly facing annular stop face upon outward movement of the cover relative to the manhole in the plate, said outwardly and rearwardly inclined peripheral wall being slit inwardly from said peripheral edge to substantially the edge of said gasket groove at multitude of equally spaced points around said edge to form multitude of locking fingers projecting outwardly and rearwardly in the plate opening with their outer ends disposed for latching abutment with the inwardly facing stop flange, an annular substantially O ring type of rubber-like gasket member seated in said gasket groove in engagement with the outer surface of the cover adjacent the groove and with the outwardly inclined wall, said low outwardly cambered portion of said cover being depressably inwardly past a plane through the gasket groove parallel to the said outer peripheral edge to rock the outer extremities of the locking fingers inwardly from under said inwardly facing flange, to free the cover member for removal from the manhole opening.

4. Apparatus as claimed in claim 3 wherein the manhole in the plate, and the inwardly facing stop flange and the outwardly facing stop face and the outwardly inclined annular wall are all circular and concentric to each other.

5. Apparatus as claimed in claim 4 wherein the outwardly cambered portion of the cover is formed with a somewhat semielliptical curvature is in cross-section, whereby the central part thereof has a flatter curvature than the cambered portion nearer the annular gasket groove, to provide for an initial depression of the central low cambered portion in advance of the outer cambered position nearer the gasket groove, upon application of pressure to the back surface of the cover, whereby the cambered portion flexes and snaps inwardly past a median plane to the other side, to snap the extremities of the locking fingers out of latching engagement with the inwardly facing flange to free the cover for withdrawal from the manhole in the plate.

6. In combination, with a pressure chamber wall having a manhole therethrough for access to the interior of the chamber, an annular flange member surrounding the periphery of the manhole, an annular abutment flange formed in the member surrounding the manhole and facing outwardly of the chamber wall in a plane substantially parallel to the face of the manhole, an annular wall flaring outwardly from the manhole at the periphery of the annular outwardly facing flange, to form an outwardly flared cover receiving opening for the manhole, an annular overhanging flange surrounding the manhole around the outer edge of the flared cover receiving opening, facing inwardly to overhang the outwardly flared opening only, to form an annular cover locking finger at the outer extremity of the outwardly flared opening, facing toward the outwardly facing annular flange, a resilient sheet metal "snap action" interlocking pressure-tight cover member for said manhole, comprising a central portion having an area substantially the same size and shape of the manhole and bowed outwardly, and an outwardly flared rim portion surrounding the bowed out area, to be received in the flared opening for inter-engagement at its outer edge with the inwardly facing overhanging flange, to lock the cover in the outwardly flared opening, the central portion of the cover being bowed outwardly with a low camber, having a decreased radius of curvature toward the periphery rather than a circular curvature in cross-section, whereby the bowed out portion can be snapped inwardly past a median plane to reverse the camber for tensioning the periphery of the outwardly flared rim of the cover inwardly from under the overhanging flange to free the cover for removal from the opening, said outwardly flared rim portion being slit inwardly at a plurality of points around the periphery to provide locking fingers integral with the outwardly cambered portion, an annular substantially U shape gasket receiving groove formed in the cover between the inner ends of the fingers and the bowed out portion, and an annular O ring rubberlike gasket member seated in the gasket groove in sealing engagement between the cover and the wall of the outwardly flared opening aforesaid.

7. In combination, a wall for a pressurized chamber having a circular manhole therethrough, a cover seating and sealing circular flange surrounding the manhole having a concentric circular cover stop flange facing outwardly, an annular concentric cover receiving circular wall extending outwardly of the manhole from the inner edge of the said concentric flange, an overhanging concentric circular cover locking flange surrounding the manhole at the outer rim of the concentric cover receiving circular opening, facing the cover stop flange, a flexible resilient circular sheet metal cover receivable in said manhole, said cover having an outwardly bowed circular central portion for closing the manhole, an annular gasket groove facing outwardly of the manhole opening surrounding the central portion, and a plurality of closely spaced locking fingers fixed on the cover and flaring outwardly from the gasket groove portion of the cover to form locking fingers for latching engagement with the inwardly facing overhanging flange at its outer extremities, whereby flexing the bowed out portion of the cover inwardly relative to the manhole retracts the extremities of the locking fingers from under the overhanging flange to free the cover, and a circular O ring rubber-like gasket ring seated in the gasket groove facing outwardly toward the stop flange and the said circular wall for sealing engagement therewith, where the circular cover is locked in the manhole.

8. Apparatus as claimed in claim 7, in which said circular wall flares outwardly from the inner edge of the circular outwardly facing stop flange to the rear edge of the circular inwardly facing overhanging cover locking flange, the opening through the overhanging stop flange being greater in diameter than the diameter of the flared circular wall adjacent the circular outwardly facing stop flange, and less in diameter than the diameter of the flared circular wall, adjacent the overhanging inwardly facing stop flange.

9. Structure as claimed in claim 8 in which the outwardly bowed cover portion is somewhat semielliptically curved in cross-section rather than circular in cross-section from its center to the gasket receiving groove.

References Cited in the file of this patent

UNITED STATES PATENTS

| | | |
|---|---|---|
| 892,403 | Christensen | July 7, 1908 |
| 1,846,310 | Chaplin | Feb. 23, 1932 |
| 2,049,228 | Sebell | July 28, 1936 |

FOREIGN PATENTS

| | | |
|---|---|---|
| 217,152 | Great Britain | June 12, 1924 |